(12) United States Patent
Chae et al.

(10) Patent No.: US 11,217,207 B2
(45) Date of Patent: Jan. 4, 2022

(54) ELECTRONIC DEVICE AND METHOD FOR CONTROLLING DISPLAY THEREOF

(71) Applicant: Samsung Electronics Co., Ltd., Suwon-si (KR)

(72) Inventors: Sang Won Chae, Seoul (KR); Jung Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 15/454,517

(22) Filed: Mar. 9, 2017

(65) Prior Publication Data
US 2017/0263212 A1 Sep. 14, 2017

(30) Foreign Application Priority Data
Mar. 10, 2016 (KR) .................. 10-2016-0029072

(51) Int. Cl.
*G09G 5/30* (2006.01)
*G06F 3/14* (2006.01)
*G09G 3/20* (2006.01)

(52) U.S. Cl.
CPC ............ *G09G 5/30* (2013.01); *G06F 3/1423* (2013.01); *G06F 3/1454* (2013.01); *G09G 3/2092* (2013.01); *G09G 2320/0613* (2013.01); *G09G 2320/0686* (2013.01); *G09G 2320/0693* (2013.01); *G09G 2320/08* (2013.01);
(Continued)

(58) Field of Classification Search
CPC .... G06F 3/1423; G06F 3/1454; G06F 1/3265; G06F 2203/04803; G06F 3/1438; G09G 5/30; G09G 3/2092; G09G 2340/0435; G09G 2340/0407; G09G 2330/021; G09G 2320/0686; G09G 2320/08; G09G 2320/0693; G09G 2320/0613; G09G 5/12; G09G 5/227; G09G 5/391; G09G 2360/04; G09G 2360/06; G09G 2360/08; G09G 2360/10; G09G 2340/10; G09G 2354/00; G09G 2320/10; H01L 27/3267; Y02D 10/00; H04N 5/45

See application file for complete search history.

(56) References Cited

U.S. PATENT DOCUMENTS 5,621,429 A * 4/1997 Yamaashi ........... G06F 3/04845
345/428
7,456,836 B2 * 11/2008 Mamiya ................ G06F 3/1446
345/1.1
(Continued)

*Primary Examiner* — Temesghen Ghebretinsae
*Assistant Examiner* — Karin Kiyabu
(74) *Attorney, Agent, or Firm* — Jefferson IP Law, LLP

(57) ABSTRACT

An electronic device is provided. The electronic device includes a plurality of displays, a memory configured to store applications and parameters associated with execution screens of the applications, and a processor which is electrically connected with the plurality of displays and the memory. The processor is configured to, when at least one application of the applications is executed, obtain a first parameter associated with a first execution screen of the at least one application and a second parameter associated with a second execution screen of the at least one application from the memory, and to output the first execution screen in one of the plurality of displays based on the first parameter and output the second execution screen in another of the plurality of displays based on the second parameter.

15 Claims, 13 Drawing Sheets

(52) U.S. Cl.
CPC ............... *G09G 2330/021* (2013.01); *G09G 2340/0407* (2013.01); *G09G 2340/0435* (2013.01)

(56) References Cited

U.S. PATENT DOCUMENTS

| | | | |
|---|---|---|---|
| 9,696,551 B2* | 7/2017 | Yang | G06F 3/0481 |
| 10,852,905 B1* | 12/2020 | Guzman | G06F 3/0482 |
| 10,878,782 B1* | 12/2020 | Guzman | G06F 3/0482 |
| 10,908,559 B1* | 2/2021 | Guzman | H04M 1/72454 |
| 10,936,345 B1* | 3/2021 | Guzman | G06F 3/14 |
| 2002/0175946 A1* | 11/2002 | Sakuta | G09G 5/003 |
| | | | 715/778 |
| 2005/0017994 A1* | 1/2005 | Oh | G09G 3/3406 |
| | | | 345/691 |
| 2007/0094519 A1* | 4/2007 | Yamamoto | G06F 1/3203 |
| | | | 713/300 |
| 2012/0054664 A1* | 3/2012 | Dougall | H04N 21/23439 |
| | | | 715/772 |
| 2013/0033477 A1* | 2/2013 | Sirpal | G06F 3/04883 |
| | | | 345/211 |
| 2013/0155067 A1* | 6/2013 | Kim | H04N 21/4126 |
| | | | 345/428 |
| 2014/0267360 A1* | 9/2014 | Finkel | G06T 11/001 |
| | | | 345/590 |
| 2014/0285498 A1* | 9/2014 | Kim | G06F 1/1643 |
| | | | 345/501 |
| 2014/0359324 A1* | 12/2014 | Park | G09G 5/00 |
| | | | 713/320 |
| 2015/0249848 A1* | 9/2015 | Holman | H04N 21/23439 |
| | | | 348/469 |
| 2015/0268916 A1 | 9/2015 | Eisenberg | |
| 2016/0110049 A1* | 4/2016 | Cassar | G06F 1/1616 |
| | | | 715/769 |
| 2016/0150471 A1* | 5/2016 | Tan | H04W 52/029 |
| | | | 455/574 |
| 2018/0219975 A1* | 8/2018 | Leppanen | G06F 3/1454 |

* cited by examiner

| | FPS | RESOLUTION | BRIGHTNESS | COLOR SPACE | CPU CLOCK | GPU CLOCK | BOOSTING |
|---|---|---|---|---|---|---|---|
| FIRST APPLICATION | 60Hz | 2560x1440 | 100 | 32bit | 2.1GHz | 600MHz | O |
| SECOND APPLICATION | 10Hz | 1600x900 | 50 | 8bit | 1.8GHz | 300MHz | X |
| ... | ... | ... | ... | ... | ... | ... | ... |

FIG. 3

| | FPS | RESOLUTION | BRIGHTNESS | COLOR SPACE | CPU CLOCK | GPU CLOCK | BOOSTING |
|---|---|---|---|---|---|---|---|
| FIRST APPLICATION | 60Hz | 2560x1440 | 100 | 32bit | 2.1GHz | 600MHz | O — 410 |
| SECOND APPLICATION | 30Hz | 1920x1080 | 80 | 16bit | 2.1GHz | 500MHz | X — 420 |
| ... | ... | ... | ... | ... | ... | ... | ... |

ELECTRONIC DEVICE AND METHOD FOR CONTROLLING DISPLAY THEREOF

CROSS-REFERENCE TO RELATED APPLICATION(S)

This application claims the benefit under 35 U.S.C. § 119(a) of a Korean patent application filed on Mar. 10, 2016 in the Korean Intellectual Property Office and assigned Serial number 10-2016-0029072, the entire disclosure of which is hereby incorporated by reference.

TECHNICAL FIELD

The present disclosure relates to an electronic device including a plurality of displays.

BACKGROUND

With the development of electronic technologies, various types of electronic products are being developed and distributed. More particularly, an electronic device, which has a variety of functions, such as a smartphone or a tablet personal computer (PC) is being widely supplied nowadays. The electronic device may include a display. An electronic device including a plurality of displays is being researched and developed to simultaneously output more information.

In general, an electronic device may output screens, in which characteristics, such as a frame per second (FPS), a resolution, brightness, and a color space are the same, by using a plurality of displays. For example, the screens of the same quality may be output through a display, which needs a high-quality screen, of the plurality of displays and through a display, which does not need a high-quality screen, of the plurality of displays. In this case, a high-quality screen may be output through a display even upon executing an application, which does not need a high-quality screen, such as an address book application, thereby causing unnecessary power consumption. More particularly, the above-described issue may be magnified in an electronic device (e.g., a mobile device) including a battery of which the usable power is limited and may be intensified when the electronic device includes a plurality of displays each consuming a lot of power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method that are capable of reducing power consumption of a display.

In accordance with an aspect of the present disclosure, an electronic device is provided. The electronic device includes a plurality of displays, a memory configured to store applications and parameters associated with execution screens of the applications, and a processor which is electrically connected with the plurality of displays and the memory. The processor is configured to, when at least one application of the applications is executed, obtain a first parameter associated with a first execution screen of the at least one application and a second parameter associated with a second execution screen of the at least one application from the memory, and to output the first execution screen in one of the plurality of displays based on the first parameter and output the second execution screen in another of the plurality of displays based on the second parameter.

In accordance with another aspect of the present disclosure, a display control method of an electronic device is provided. The display control method includes, when at least one application is executed, obtaining a first parameter associated with a first execution screen of the at least one application and a second parameter associated with a second execution screen of the at least one application from a memory, and outputting the first execution screen in one of a plurality of displays based on the first parameter and outputting the second execution screen in another of the plurality of displays based on the second parameter.

In accordance with another aspect of the present disclosure, an electronic device is provided. The electronic device includes at least one display comprising a first area and a second area for displaying at least one content, and a processor. The processor is configured to verify attribute information of first content and second content, which will be displayed through the at least one display, to determine a first parameter of the first content, which is associated with the at least one display, and a second parameter of the second content, which is associated with the at least one display, and to display the first content through the first area by using the first parameter and display the second content through the second area by using the second parameter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates parameters mapped onto applications stored in an electronic device according to an embodiment of the present disclosure;

FIG. 4 illustrates parameters mapped onto applications stored in an electronic device according to an embodiment of the present disclosure;

Throughout the drawings, it should be noted that like reference numbers are used to depict the same or similar elements, features, and structures.

DETAILED DESCRIPTION

Figure 1A:
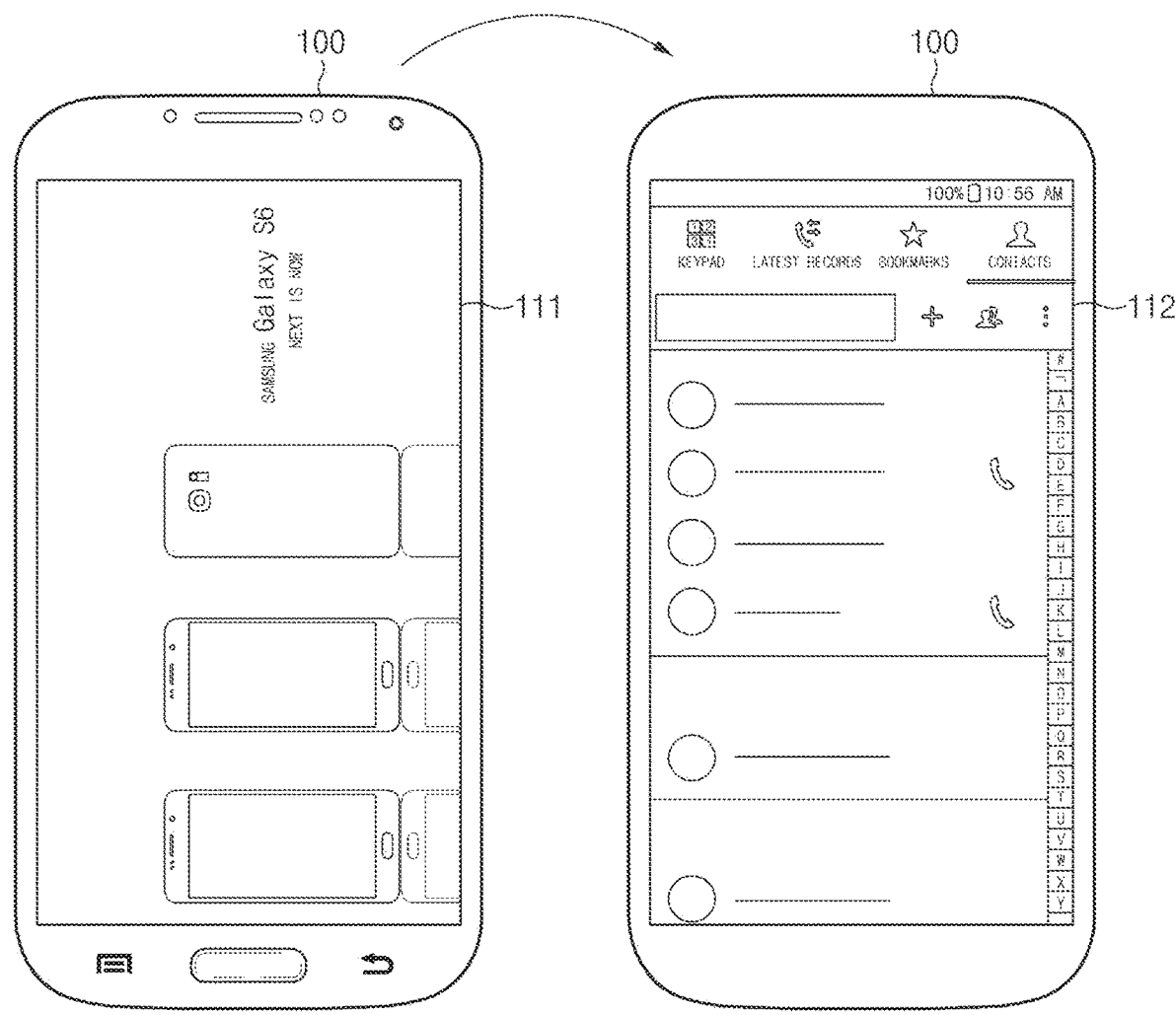
FIG. 1A illustrates an operating environment of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the disclosure disclosed herein, the expressions "have", "may have", "include" and "comprise", or "may include" and "may comprise" used herein indicate existence of corresponding features (e.g., elements, such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in this disclosure are used to describe specified embodiments of the present disclosure and are not intended to limit the scope of the present disclosure. All the terms used herein, which include technical or scientific terms, may have the same meaning that is generally understood by a person skilled in the art. It will be further understood that terms, which are defined in a dictionary and commonly used, should also be interpreted as customary in the relevant related art and not in an idealized or overly formal detect unless expressly so defined herein in various embodiments of the present disclosure. In some cases, even if terms are terms which are defined in the disclosure, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer-3 (MP3) players, mobile medical devices, cameras, or wearable devices. According to various embodiments of the present disclosure, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to various embodiments of the present disclosure, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to another embodiment of the present disclosure, the photographing apparatus may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments of the present disclosure, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. The term "user" used herein may refer to a person who uses an electronic device or may refer to a device (e.g., an artificial intelligence electronic device) that uses an electronic device.

FIG. 1A illustrates an operating environment of an electronic device according to an embodiment of the present disclosure.

Referring to FIG. 1A, an electronic device 100 may include a first display 111 and a second display 112. For example, the first display 111 may be disposed on a front surface of the electronic device 100, and the second display 112 may be disposed on a rear surface of the electronic device 100.

The first display 111 and the second display 112 may display different screens. For example, in the case where a video play application and an address book application are executed in the electronic device 100, the first display 111 may display a video being played, and the second display 112 may display an address book. For example, a high frame per second (FPS), a high resolution, high brightness, or a wide color space may be needed to display the video. A high FPS, a high resolution, high brightness, or a wide color space may not be needed to display the address book that mainly includes text.

The electronic device 100 may apply different setting values to the first display 111 and the second display 112 based on screens to be displayed and may drive the first display 111 and the second display 112. A setting value corresponding to each of the video and the address book may be a value that is stored in advance. For example, the electronic device 100 may apply a high FPS, a high resolution, high brightness, or a wide color space to the first display 111 that displays the video. In this case, the first display 111 may output a high-quality screen. The electronic device 100 may apply a low FPS, a low resolution, low brightness, or a narrow color space to the second display 112 that displays the address book. In this case, the second display 112 may output a screen by using low power. Accordingly, the electronic device 100 may drive a display, which outputs content not needing a high-quality screen, by using low power.

Figure 1B:
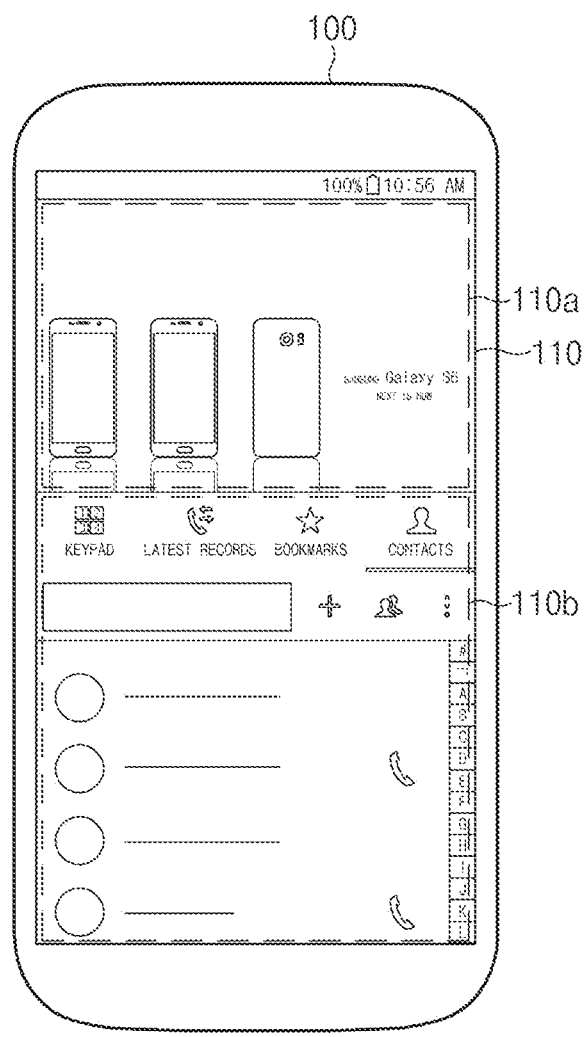
FIG. 1B illustrates an operating environment of an electronic device according to an embodiment of the present disclosure.

FIG. 1B illustrates an operating environment of an electronic device according to an embodiment of the present disclosure.

Referring to FIG. 1B, the electronic device 100 may include a display 110. The display 110 may be disposed on a front surface of the electronic device 100 and may include a first area 110a and a second area 110b.

The first area 110a and the second display 110b of the display 110 may display different screens. For example, in the case where the video play application and the address book application are executed in the electronic device 100, the first area 110a may display the video being played, and the second area 110b may display the address book.

The electronic device 100 may apply different setting values to the first area 110a and the second area 110b based on screens to be displayed and may drive the display 110. A setting value corresponding to each of the video and the address book may be a value that is stored in advance. For example, the electronic device 100 may apply a high FPS, a high resolution, high brightness, or a wide color space to the first area 110a that displays the video. In this case, the first area 110a may output a high-quality screen. The electronic device 100 may apply a low FPS, a low resolution, low brightness, or a narrow color space to the second area 110b that displays the address book. In this case, the second area 110b may output a screen by using low power. Accordingly, the electronic device 100 may drive a partial area of the display 110, which outputs content not needing a high-quality screen, by using low power.

Figure 2A:
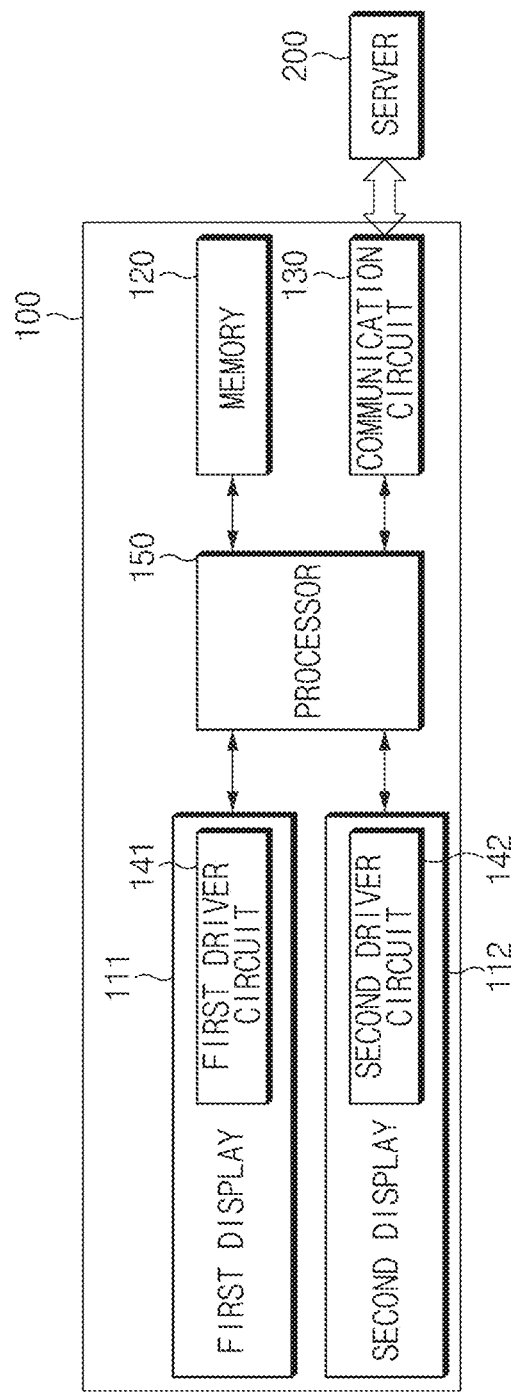
FIG. 2A is a block diagram illustrating a configuration of an electronic device according to an embodiment of the present disclosure.

FIG. 2A is a block diagram illustrating a configuration of an electronic device according to an embodiment of the present disclosure.

Referring to FIG. 2A, the electronic device 100 according to an embodiment may include the first display 111, the second display 112, a memory 120, a communication circuit 130, and a processor 150. According to an embodiment of the present disclosure, the first display 111 and the second display 112 may include a first driver circuit 141 and a second driver circuit 142, respectively.

The first display 111 may be disposed on a surface (e.g., the front surface) of the electronic device 100. The first display 111 may display an execution screen of an application that is executed in the electronic device 100. The first display 111 may display content stored in the electronic device 100. The first display 111 may include a first area for displaying an execution screen or content.

The second display 112 may be disposed on a surface (e.g., the rear surface) of the electronic device 100, which is different from the surface on which the first display 111 is disposed. The second display 112 may display an execution screen that is different from an execution screen displayed in the first display 111. The second display 112 may display content that is different from content displayed in the first display 111. The display 112 may include a second area for displaying an execution screen or content.

The electronic device 100 is illustrated in FIG. 2A as including the first display 111 and the second display 112. However, various embodiments are not limited thereto. For example, the electronic device 100 may include three or more displays. In addition, the first display 111 and the second display 112 may be disposed at various locations of the electronic device 100 so as not to overlap each other.

The memory 120 may include a volatile memory and/or a nonvolatile memory. The memory 120 may store applications or content. The memory 120 may store parameters associated with execution screens of the applications or content. The memory 120 may also store a database including parameters mapped onto the applications. The applications (or content) and the parameters may be stored in different memories. For example, the applications (or content) may be stored in a nonvolatile memory, and the parameters may be stored in a volatile memory.

The communication circuit 130 may include, for example, a cellular module, a Wi-Fi module, and the like. The communication circuit 130 may communicate with a server 200 in which the database including the parameters is stored. The communication circuit 130 may transmit the parameters stored in the electronic device 100 to the server 200 and may receive the parameters stored in the server 200 from the server 200.

The first display 111 may include the first driver circuit 141, and the second display 112 may include the second driver circuit 142. The first driver circuit 141 and the second driver circuit 142 may drive the first display 111 and the second display 112, respectively. The first driver circuit 141 and the second driver circuit 142 may implement images by adjusting pixels included in the first display 111 and the second display 112, respectively. Each of the first driver circuit 141 and the second driver circuit 142 may be, for example, a display driver integrated circuit (IC) display driver IC (DDI). The first driver circuit 141 and the second driver circuit 142 may respectively drive the first display 111 and the second display 112 by using the parameters stored in the memory 120.

An embodiment is illustrated in FIG. 2A as the first driver circuit 141 and the second driver circuit 142 are respectively included in the first display 111 and the second display 112. However, various embodiments are not limited thereto. For example, in the case where the first display 111 and the second display 112 are flexible displays, the first driver circuit 141 and the second driver circuit 142 may be implemented with modules that are separated from the first display 111 and the second display 112.

In addition, an embodiment is illustrated in FIG. 2A as the electronic device 100 includes the first driver circuit 141 and the second driver circuit 142. However, various embodiments are not limited thereto. For example, in the case where the electronic device 100 includes three or more displays, the electronic device 100 may include three or more driver circuits that control the three or more displays, respectively.

The processor 150 may be electrically connected with the first display 111, the second display 112, the memory 120, and the communication circuit 130. The processor 150 may control the first display 111, the second display 112, the memory 120, and the communication circuit 130. The processor 150 may include, for example, a CPU and a graphics processing unit (GPU).

According to an embodiment of the present disclosure, the processor 150 may execute one or more applications of the applications. The processor 150 may execute an application, for example, if an instruction is received through a touch panel included in the first display 111 or the second display 112 from a user. As another example, if a specific condition is satisfied, the processor 150 may execute an application corresponding to the specific condition. The processor 150 may execute a plurality of applications at the same time.

According to an embodiment of the present disclosure, when one or more applications of the applications are executed, the processor 150 may obtain a first parameter associated with a first execution screen of the one or more applications and a second parameter associated with a second execution screen of the one or more applications from the memory 120.

The first execution screen and the second execution screen may be a screen associated with one application. For example, in the case where a game application is executed in the electronic device 100, the first execution screen may be a game screen, and the second execution screen may be a screen associated with a launcher or a game controller user interface (UI). The first execution screen and the second execution screen may be screens associated with different applications. For example, in the case where a first application and a second application are executed in the electronic device 100, the first execution screen may be an execution screen of the first application, and the second execution screen may be an execution screen of the second application.

The parameter may include various setting values for driving a display. The parameter may include setting values associated with one or more of a FPS, a resolution, brightness, a color space, a CPU clock, a GPU clock, or boosting (e.g., whether the CPU or GPU is boosted).

The processor 150 may obtain, for example, the first parameter mapped onto the first execution screen and the second parameter mapped onto the second execution screen from the memory 120. For example, the memory 120 may store a database including an execution screen (or application) and a parameter associated with the execution screen (or application). The processor 150 may obtain the first parameter and the second parameter from the database.

According to an embodiment of the present disclosure, the processor 150 may output the first execution screen in one of a plurality of displays based on the first parameter and may output the second execution screen in another of the plurality of displays based on the second parameter. For example, the processor 150 may apply setting values included in the first parameter to the first display 111 and may output the first execution screen in the first display 111. Simultaneously or sequentially, the processor 150 may apply setting values included in the second parameter to the second display 112 and may output the second execution screen in the second display 112. The first parameter and the second parameter may be different from each other. For example, the processor 150 may apply different parameters to the first display 111 and the second display 112, respectively.

According to an embodiment of the present disclosure, the processor 150 may control the driver circuit 141 or 142 associated with one of the plurality of displays based on the first parameter and may control the driver circuit 142 or 141 associated with another of the plurality of displays based on the second parameter. For example, in the case where the first display 111 may be controlled by the first driver circuit 141 and the second display 112 is controlled by the second driver circuit 142, the processor 150 may control the first driver circuit 141 and the second driver circuit 142 by using a parameter. The processor 150 may control the first driver circuit 141 such that a screen is output in the first display 111 based on the first parameter and may control the second driver circuit 142 such that a screen is output in the second display 112 based on the second parameter.

According to an embodiment of the present disclosure, the processor 150 may verify attribute information of first content and second content to be displayed through a display. For example, if an instruction to display the first content and the second content is received, the processor 150 may verify the attribute information of the first content and the second content. The attribute information may include information for identifying the first content and the second content. The attribute information may include information for characteristics (e.g., an image quality of content) of the first content and the second content. The content may include various information, which will be output through a display, such as pictures, images, applications, and the like.

According to an embodiment of the present disclosure, the processor 150 may determine the first parameter associated with the first content and the second parameter associated with the second content based on the attribute information. For example, the processor 150 may determine the first parameter corresponding to the attribute information of the first content by using a database stored in the memory 120. The first parameter may be associated with a display in which the first content will be displayed. In addition, the processor 150 may determine the second parameter corresponding to the attribute information of the second content by using the database stored in the memory 120. The second parameter may be associated with a display in which the second content will be displayed. The database may include a parameter corresponding to the attribute information.

According to an embodiment of the present disclosure, the processor 150 may display the first content through a first area by using the first parameter and may display the second content through a second area by using the second parameter. For example, the processor 150 may apply setting values included in the first parameter to the first area and may display the first content in the first area. Simultaneously or sequentially, the processor 150 may apply setting values included in the second parameter to the second area and may display the second content in the second area. The processor 150 may apply different parameters to the first area and the second area, respectively.

According to an embodiment of the present disclosure, the processor 150 may display the first content through at least a portion of the first display 111 and may display the second content through at least a portion of the second display 112. For example, the processor 150 may display the first content in the first display 111 and may display the second content in the second display 112.

For example, the processor 150 may control a first display driver IC (e.g., the first driver circuit 141) that displays the first content based on the first parameter and may control a second display driver IC (e.g., the second driver circuit 142) that displays the second content based on the second parameter. The first display driver IC may display a screen, to which setting values included in the first parameter are applied, in the first display 111. The second display driver IC may display a screen, to which setting values included in the second parameter are applied, in the second display 112.

Figure 2B:
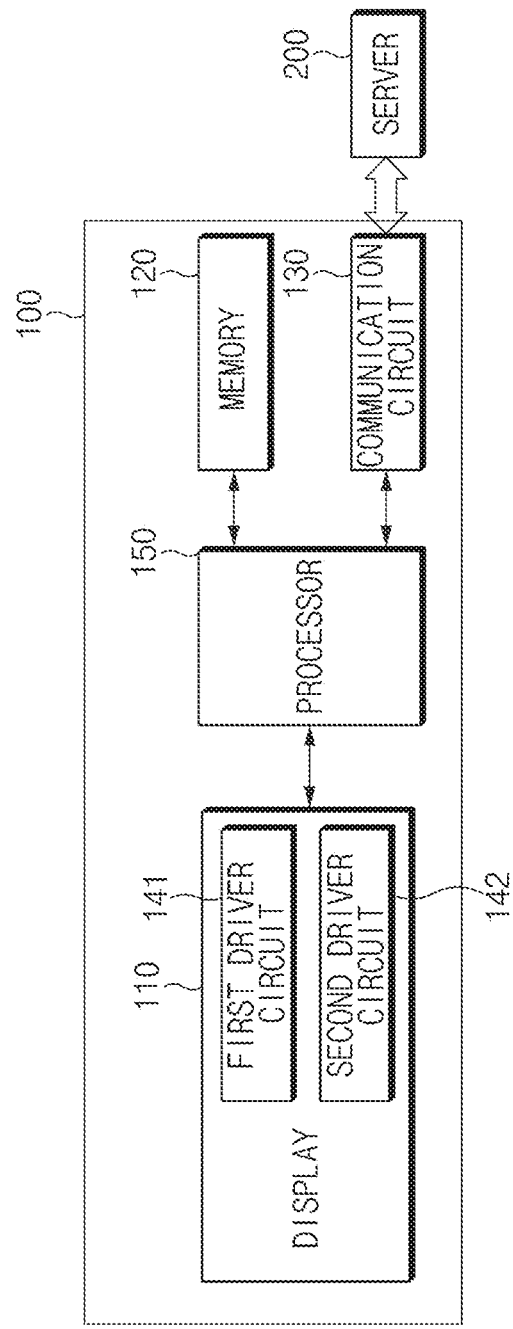
FIG. 2B is a block diagram illustrating a configuration of an electronic device according to an embodiment of the present disclosure.

FIG. 2B is a block diagram illustrating a configuration of an electronic device according to an embodiment of the present disclosure.

Referring to FIG. 2B, the electronic device 100 according to an embodiment may include the display 110, the memory 120, the communication circuit 130, and the processor 150.

A display may be disposed on a surface (a front surface of an electronic device) of an electronic device. The display may include a first area and a second area for displaying at least one content. For example, the display may display first content in the first area and may display second content in the second area.

According to an embodiment of the present disclosure, the display may include a first driver circuit and a second driver circuit. Each of the first driver circuit and the second driver circuit may be a display driver IC. The first driver circuit and the second driver circuit may drive the first area and the second area of the display, respectively. For example, the first driver circuit and the second driver circuit may implement images by adjusting pixels included in the first area and the second area, respectively. The first driver circuit and the second driver circuit may control a display on the first area and the second area by using parameters stored in a memory.

The memory may store content to be displayed through the display. The memory may store a parameter of the stored content. The memory may store a database including a parameter.

A communication circuit may include, for example, a cellular module, a Wi-Fi module, and the like. The communication circuit may communicate with a server in which the database including the parameter is stored. The communication circuit may transmit a parameter stored in the electronic device to the server and may receive a parameter stored in the server from the server.

A processor may be electrically connected with the display, the memory, and the communication circuit. The processor may control the display, the memory, and the communication circuit. The processor may include, for example, a CPU and a GPU.

According to an embodiment of the present disclosure, the processor may verify attribute information of the first content and the second content to be displayed through the display. The attribute information may include, for example, information for identifying the first content and the second content.

According to an embodiment of the present disclosure, the processor may determine a first parameter of the first content and a second parameter of the second content based on the attribute information. For example, the processor may identify the first content and the second content by using the attribute information and may obtain the first parameter mapped onto the first content and the second content mapped onto the second content. As another example, the processor may obtain the first parameter mapped onto attribute information of the first content and the second parameter mapped onto attribute information of the second content.

According to an embodiment of the present disclosure, the processor may store a parameter corresponding to the attribute information in a database. The processor may determine the first parameter and the second parameter based on the database in which the parameter is stored.

According to an embodiment of the present disclosure, the processor may drive one display based on different parameters. For example, the processor may display the first content through the first area by using the first parameter and may display the second content through the second area by using the second parameter. The processor may control a first driver circuit that displays the first content based on the first parameter and may control a second driver circuit that displays the second content based on the second parameter.

FIG. 3 illustrates parameters mapped onto applications stored in an electronic device according to an embodiment of the present disclosure.

According to an embodiment of the present disclosure, an electronic device (e.g., the processor 150) may obtain a first parameter 310 corresponding to a first application from a memory (e.g., a database stored in the memory) in response to execution of the first application. The electronic device may obtain a second parameter 320 corresponding to a second application from the memory in response to execution of the second application. The electronic device may display an execution screen of the first application in a first display based on the first parameter 310 and may display an execution screen of the second application in a second display based on the second parameter 320.

Referring to FIG. 3, the electronic device according to an embodiment may include a database 300 that includes parameters mapped onto applications. For example, the first parameter mapped onto the first application and the second parameter mapped onto the second application may be stored in the memory. Each of the first parameter 310 and the second parameter 320 may include setting values associated with a FPS, a resolution, brightness, a color space, a CPU clock, a GPU clock, and boosting. The first parameter 310 and the second parameter 320 may include setting values that are appropriate to display execution screens of the first application and the second application, respectively. The first application may require an execution screen of a higher quality than the second application. The first parameter 310 may include, for example, setting values, such as a FPS of 60 Hz, a resolution of 2560*1440, brightness of 100, a color space of 32 bits, a CPU clock of 2.1 GHz, a GPU clock of 600 MHz, and boosting execution. The second parameter 320 may include, for example, setting values, such as a FPS of 10 Hz, a resolution of 1600*900, brightness of 50, a color space of 8 bits, a CPU clock of 1.8 GHz, a GPU clock of 300 MHz, and non-boosting.

If the first application is executed, the electronic device (e.g., the processor 150) may apply the setting values, such as a FPS of 60 Hz, a resolution of 2560*1440, brightness of 100, and a color space of 32 bits, to a display (e.g., the first display 111), in which an execution screen of the first application will be displayed, of a plurality of displays. If the second application is executed, the electronic device may apply the setting values, such as a FPS of 10 Hz, a resolution of 1600*900, brightness of 50, and a color space of 8 bits, to a display (e.g., the second display 112), in which an execution screen of the second application will be displayed, of the plurality of displays.

The electronic device may apply one parameter, which is for requiring higher performance, of the first parameter 310 and the second parameter 320 to some of the setting values included in the parameters. For example, different parameters may not be simultaneously applied to CPU clocks, GPU clocks, and boosting included in area "A" Accordingly, in the case where the first application and the second application are executed, the electronic device may respectively set the CPU clock and the GPU clock to 2.1 GHz and 600 MHz and may boost the CPU and the GPU.

An embodiment is illustrated in FIG. 3 as a parameter is mapped onto an application. However, various embodiments are not limited thereto. For example, a parameter may be mapped onto an execution screen of an application or content. For example, the first parameter 310 and the second parameter 320 may be respectively mapped onto a first execution screen and a second execution screen, and the first parameter 310 and the second parameter 320 may be respectively mapped onto first content and second content.

According to various embodiments of the present disclosure, the electronic device (e.g., the processor 150) may select a display, which will output an execution screen of an application, based on specifications of displays and requirements of applications.

For example, in the case where the electronic device includes a first display and a second display, the first display may be a display that supports a force touch for sensing pressure of a touch input, and the second display may be a display that does not support the force touch. The electronic device may determine specifications of the first display and the second display. Meanwhile, a first application among applications being executed in the electronic device may be an application that makes use of the force touch, and a second application thereof may be an application that does not make use of the force touch. A first parameter associated with the first application and a second parameter associated with the second application may include a parameter indicating whether to use the force touch. After the electronic device verifies the first parameter and the second parameter, the electronic device may output an execution screen of the first application in the first display supporting the force touch, based on the first parameter. The electronic device may output an execution screen of the second application in the second display based on the second parameter.

According to various embodiments of the present disclosure, in the case where execution screens of two or more applications are output in one display, the electronic device (e.g., the processor 150) may select one of parameters of the two or more applications and may apply the selected parameter to the display.

For example, in the case where the electronic device supports a multi-window function, the electronic device may output execution screens of two or more applications in one display. The electronic device may display, for example, an execution screen of a first application in a first area of a display and may display an execution screen of a second application in a second area of the display. The electronic device may output the execution screens of the first application and the second application based on one of a first parameter associated with the execution screen of the first application and a second parameter associated with the execution screen of the second application. For example, in the case where the first application is executed in foreground and the second application is executed in background, the electronic device may output the execution screens of the first application and the second application based on the first parameter. As another example, in the case where the second parameter requires higher specifications than the first parameter, the electronic device may output the execution screens of the first application and the second application based on the second parameter. The electronic device may output an execution screen of a third application in a display different from the display, based on a third parameter associated with the third application.

FIG. 4 illustrates parameters mapped onto applications stored in an electronic device according to an embodiment of the present disclosure.

According to an embodiment of the present disclosure, an electronic device (e.g., the processor 150) may measure a system load while a first execution screen (or first content) or a second execution screen (or second content) is displayed. The electronic device may change (or adjust) a first parameter or a second parameter based on the system load. If the first parameter or the second parameter is changed, the electronic device may store the first parameter or the second parameter in a memory. The electronic device may update a database included in the memory with the changed first parameter or the changed second parameter.

Referring to FIG. 4, the electronic device according to an embodiment of the present disclosure may include a database 400 that includes parameters mapped onto applications. For example, a first parameter 410 mapped onto a first application and a second parameter 420 mapped onto a second application may be stored in the memory.

For example, in the case where execution screens of the first application and the second application are displayed according to the first parameter 310 and the second parameter 320 described with reference to FIG. 3, the electronic device may measure the system load. The system load may include, for example, heating of a CPU, heating of a GPU, utilization of the CPU, utilization of the GPU, or the like. In the case where a system load according to execution of the second application is larger than a specific value, the electronic device may determine that a high-quality execution screen is required for the second application.

In this case, the electronic device may adjust the second parameter 420 mapped onto the second application. For example, in the second parameter 420, a FPS may be changed from 10 Hz to 30 Hz, a resolution from 1600*900 to 1920*1080, brightness from 50 to 80, a color space from 8 bits to 16 bits, a CPU clock from 1.8 GHz to 2.1 GHz, and a GPU clock from 300 MHz to 500 MHz. Some of the setting values of the second parameter 420 may not be changed (e.g., boosting).

The electronic device may store the adjusted second parameter 420 in the memory. The electronic device may change the second parameter 320 (illustrated in FIG. 3) stored in the memory into the adjusted second parameter 420. The electronic device may update the database 400 including parameters by changing the second parameter 420.

If the second application is again executed, the electronic device may display the execution screen of the second application in the display based on the second parameter 420.

An embodiment is illustrated in FIG. 4 as a parameter is mapped onto an application. However, various embodiments are not limited thereto. For example, a parameter may be mapped onto an execution screen of an application or content. For example, the first parameter 410 and the second parameter 420 may be respectively mapped onto a first execution screen and a second execution screen, and the first parameter 410 and the second parameter 420 may be respectively mapped onto first content and second content.

Figure 5:
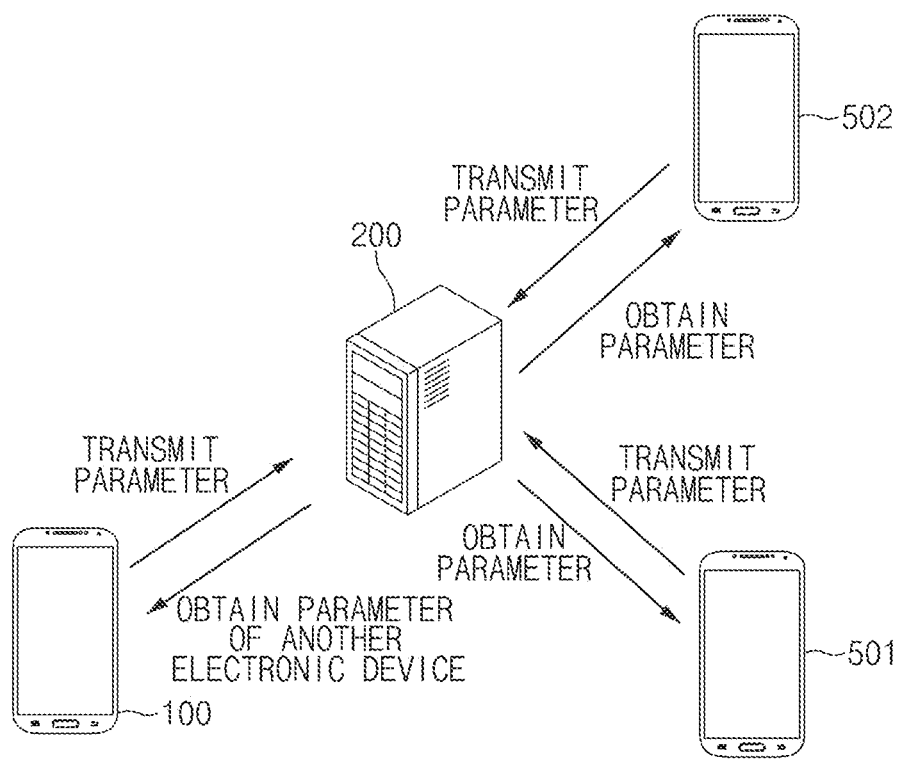
FIG. 5 illustrates an electronic device obtains a parameter of another electronic device from a server according to an embodiment of the present disclosure.

FIG. 5 illustrates an electronic device obtains a parameter of another electronic device from a server according to an embodiment of the present disclosure.

Referring to FIG. 5, the electronic device 100 according to an embodiment may communicate with the server 200. The server 200 may communicate with a first external electronic device 501 and a second external electronic device 502.

The electronic device 100 may transmit a parameter stored in a memory (e.g., the memory 120 of FIGS. 2A and 2B) of the electronic device 100 to the server 200. For example, the electronic device 100 may transmit the parameter stored in the memory to the server 200 periodically (or if a specific condition is satisfied). As another example, if the parameter (e.g., a first parameter or a second parameter) is changed, the electronic device 100 may transmit the changed parameter (e.g., a changed parameter of the first parameter and the second parameter) to the server 200 by using a communication module included in the electronic device 100. The parameter transmitted to the server 200 may be stored in a database included in the server 200. The parameter stored in the database of the server 200 may be transmitted to another external device, such as the first external electronic device 501 or the second external electronic device 502. For example, the first external electronic device 501 and the second external electronic device 502 may obtain a parameter from the server 200 periodically (or if a specific condition is satisfied).

The first external electronic device 501 and the second external electronic device 502 may transmit parameters respectively stored in the first external electronic device 501 and the second external electronic device 502 to the server 200. For example, the first external electronic device 501 and the second external electronic device 502 may transmit the parameters to the server 200 in the same manner as the electronic device 100. The parameters transmitted to the server 200 may be stored in the database included in the server 200. The electronic device 100 may obtain the parameters stored in the database of the server 200, for example, the parameters transmitted from the first external electronic device 501 and the second external electronic device 502 from the server 200.

As described above, optimized parameters may be shared by a plurality of users or the electronic device 100 through the server 200 in which the database including parameters are included.

Figure 6:
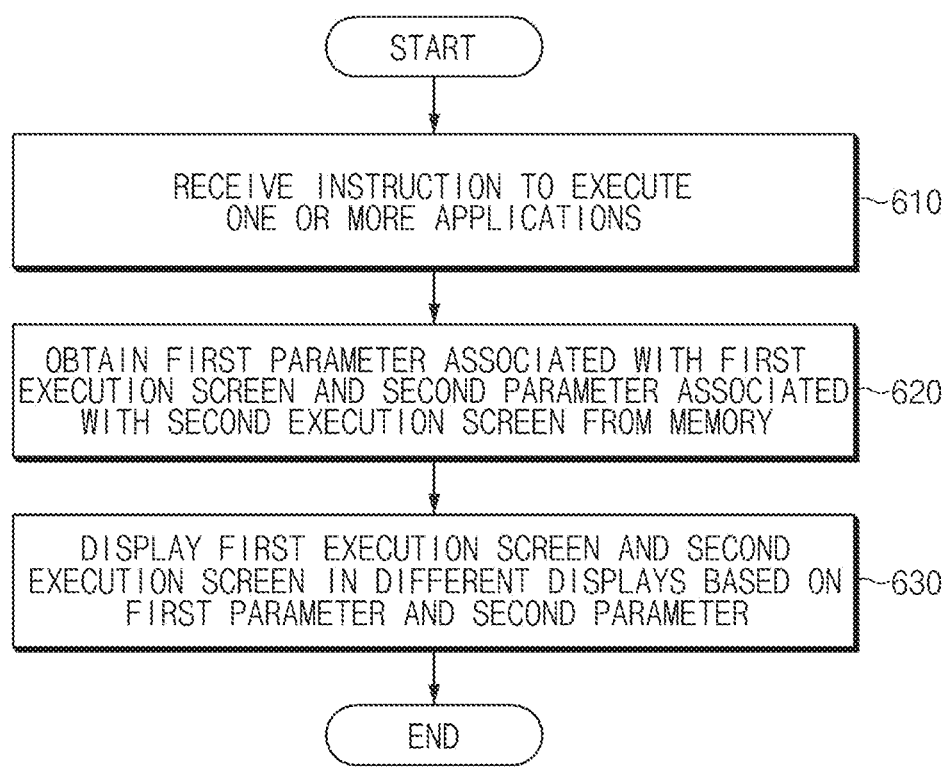
FIG. 6 is a flowchart for describing a display control method of an electronic device according to an embodiment of the present disclosure.

FIG. 6 is a flowchart for describing a display control method of an electronic device according to an embodiment of the present disclosure.

The flowchart illustrated in FIG. 6 may include operations that the electronic device 100 illustrated in FIG. 1A, 1B, 2A, or 2B processes. Even though omitted below, the description of the electronic device 100 given with reference to FIG. 1A, 1B, 2A, or 2B may be applied to the flowchart illustrated in FIG. 6.

Referring to FIG. 6, in operation 610, the electronic device 100 (e.g., the processor 150) may execute one or more applications. For example, the electronic device 100 may receive an instruction to execute a game application from a user. The electronic device 100 may execute the game application in response to the instruction.

In operation 620, the electronic device 100 (e.g., the processor 150) may obtain a first parameter associated with a first execution screen and a second parameter associated with a second execution screen from a memory. For example, the electronic device 100 may obtain the first parameter and the second parameter in response to execution of the game application. The first execution screen may include, for example, a game screen. The second execution screen may include, for example, a UI including a game controller. The electronic device 100 may obtain the first parameter mapped onto the first execution screen and the second parameter mapped onto the second execution screen from the memory. Setting values included in the first parameter may be determined to output a screen of a high quality compared with setting values included in the second parameter.

In operation 630, the electronic device 100 (e.g., the processor 150) may respectively display the first execution screen and the second execution screen in different displays based on the first parameter and the second parameter. For example, the electronic device 100 may apply the first parameter to a first display and may display the game screen in the first display. By applying the first parameter to the first display, a game screen in which graphics of a high quality are included may be output with a high quality. The electronic device 100 may apply the second parameter to a second display and may display the UI in the second display. Power that is consumed to display the UI being simple and almost stationary may be reduced by applying the second parameter to the second display.

Figure 7:
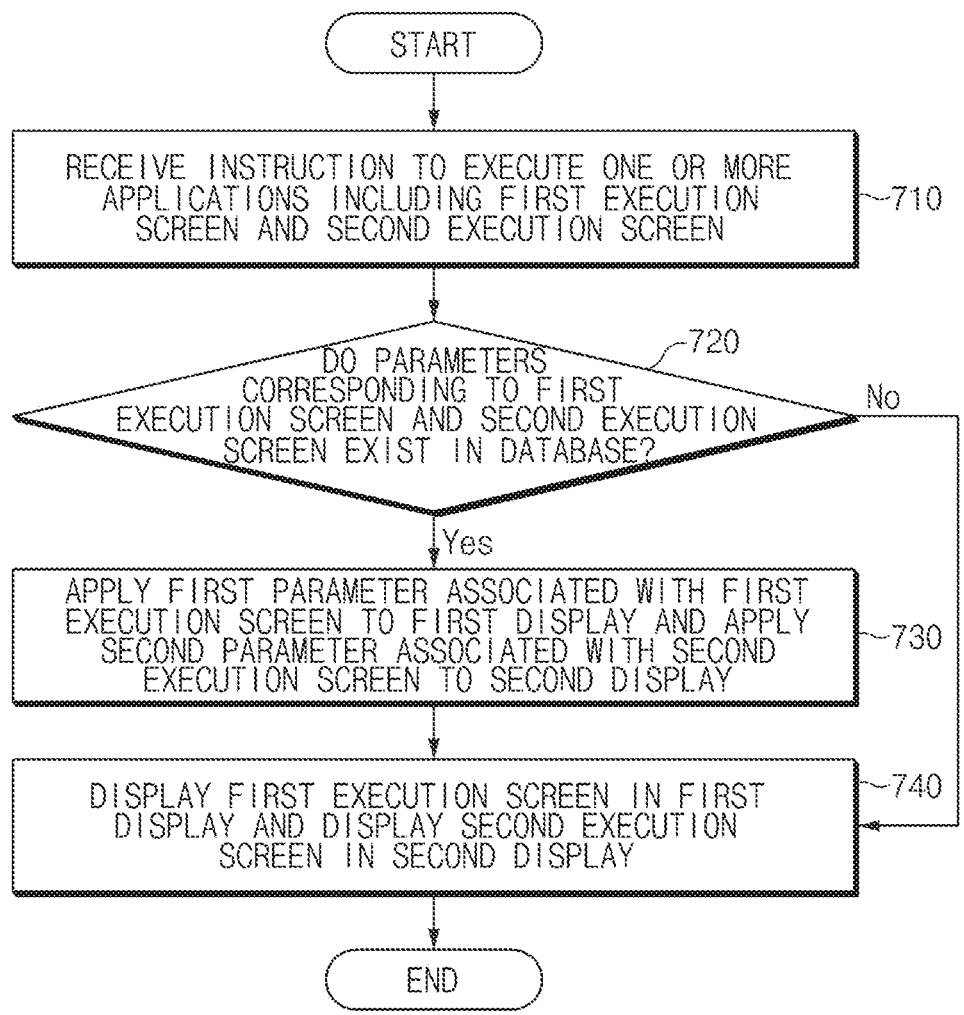
FIG. 7 is a flowchart for describing a display control method of an electronic device according to an embodiment of the present disclosure.

FIG. 7 is a flowchart for describing a display control method of an electronic device according to an embodiment of the present disclosure.

The flowchart illustrated in FIG. 7 may include operations that the electronic device 100 illustrated in FIG. 1A, 1B, 2A, or 2B processes. Even though omitted below, the description of the electronic device 100 given with reference to FIG. 1A, 1B, 2A, or 2B may be applied to the flowchart illustrated in FIG. 7.

Referring to FIG. 7, in operation 710, the electronic device 100 (e.g., the processor 150) may receive an instruction to execute one or more applications including a first execution screen and a second execution screen. For example, the electronic device 100 may receive an instruction to execute a video play application and an instruction to execute an address book application from a user. The electronic device 100 may execute the video play application and the address book application in response to the instructions. Each of the video play application and the address book application may include an execution screen.

In operation 720, the electronic device 100 (e.g., the processor 150) may determine whether parameters corresponding to the first execution screen and the second execution screen are present in a database. For example, the electronic device 100 may search the database stored in a memory (e.g., the memory 120) for a parameter corresponding to an execution screen of the video play application. In addition, the electronic device 100 may search the database stored in the memory for a parameter corresponding to an execution screen of the address book application. If the parameter is found, the electronic device 100 may perform operation 730. If the parameter is not found, the electronic device 100 may output an execution screen based on a default setting value(s). Setting values included in a parameter associated with the video play application may be determined to output a screen of a high quality compared with setting values included in a parameter associated with the address book application.

In operation 730, the electronic device 100 (e.g., the processor 150) may apply the first parameter associated with the first execution screen to a first display and may apply the second parameter associated with the second execution screen to a second display. For example, the electronic device 100 may apply the parameter associated with the execution screen of the video play application to the first display and may apply a parameter associated with the execution screen of the address book application to the second display. The first display and the second display may display screens based on setting values included in the parameters applied to the first display and the second display.

In operation 740, the electronic device 100 (e.g., the processor 150) may display the first execution screen in the first display and may display the second execution screen in the second display. For example, the electronic device 100 may output the execution screen of the video play application in the first display that is configured to output a screen of a high quality based on the corresponding parameter. The electronic device 100 may output the execution screen of the address book application in the second display that is configured to output a screen, which is capable of reducing power consumption, based on the corresponding parameter.

Figure 8:
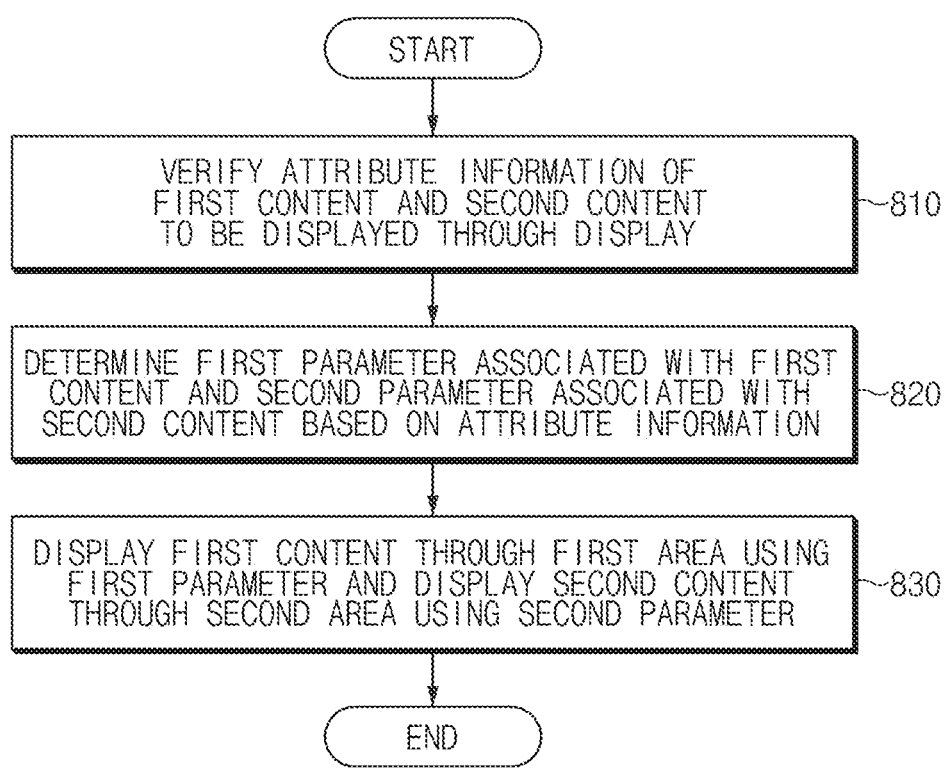
FIG. 8 is a flowchart for describing a display control method of an electronic device according to an embodiment of the present disclosure.

FIG. 8 is a flowchart for describing a display control method of an electronic device according to an embodiment of the present disclosure.

The flowchart illustrated in FIG. 8 may include operations that the electronic device 100 illustrated in FIG. 1A, 1B, 2A, or 2B processes. Even though omitted below, the description of the electronic device 100 given with reference to FIG. 1A, 1B, 2A, or 2B may be applied to the flowchart illustrated in FIG. 8.

Referring to FIG. 8, in operation 810, an electronic device (e.g., the processor 150) may verify attribute information of first content and second content to be displayed through a display. For example, in the case of displaying standard-definition (SD) content and full high-definition (FHD) content, the electronic device may verify attribute information of the SD content and the FHD content.

In operation 820, the electronic device 100 (e.g., the processor 150) may determine a first parameter associated with the first content and a second parameter associated with the second content based on the attribute information. For example, the electronic device may determine the first parameter corresponding to the SD content and the second parameter corresponding to the FHD content. The first parameter may include setting values appropriate to play the SD content, and the second parameter may include setting values appropriate to play the FHD content. The setting values included in the second parameter may be determined to output a screen of a high quality compared with the setting values included in the first parameter.

In operation 830, the electronic device (e.g., the processor 150) may display the first content through a first area by using the first parameter and may display the second content through a second area by using the second parameter. For example, the processor 150 may display the SD content through the first area included in a first display based on the first parameter. The processor 150 may display the FHD content through the second area included in a second display based on the second parameter.

Figure 9:
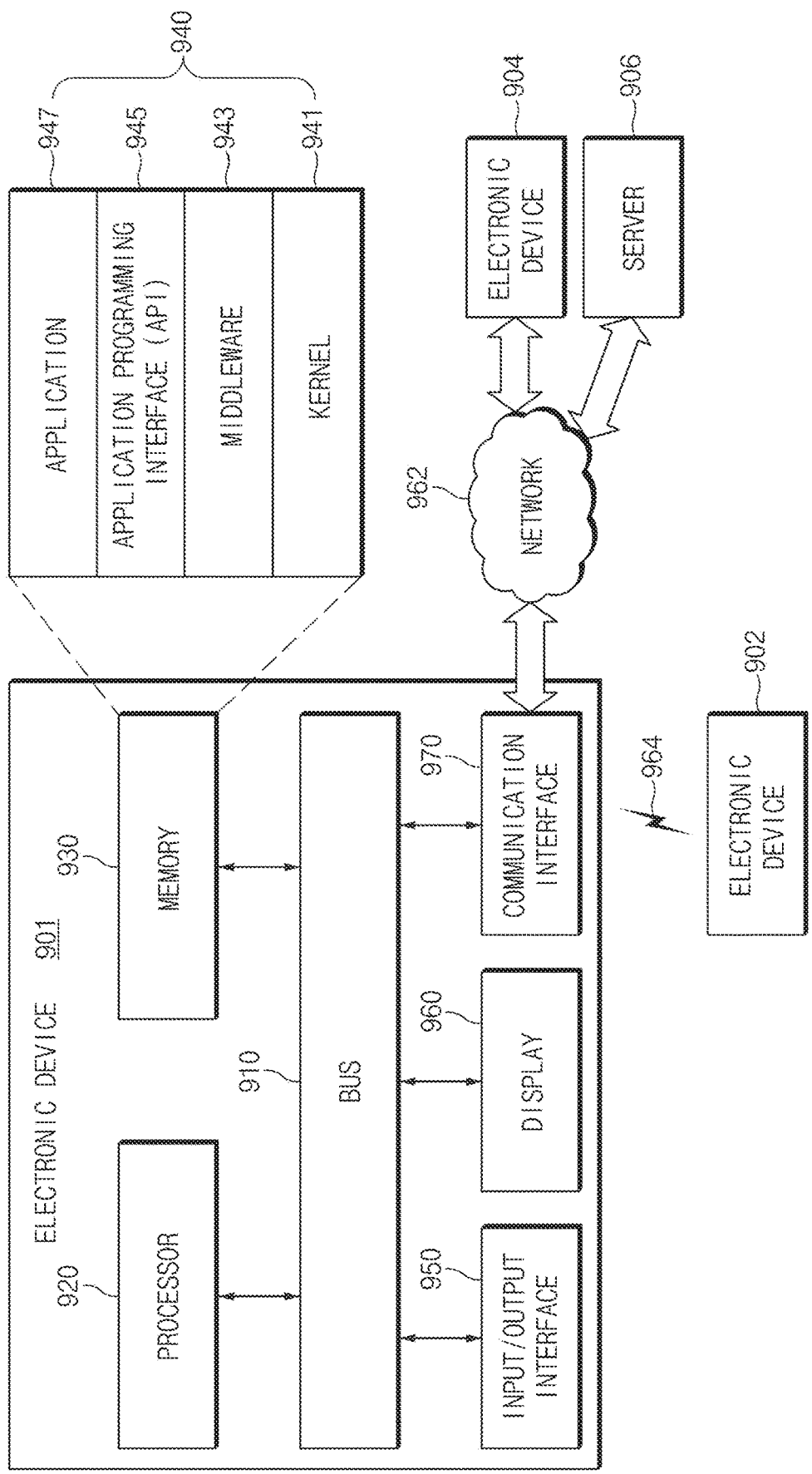
FIG. 9 is a diagram illustrating an electronic device in a network environment according to various embodiments of the present disclosure.

FIG. 9 is a diagram illustrating an electronic device in a network environment according to various embodiments of the present disclosure.

Referring to FIG. 9, according to various embodiments of the present disclosure, an electronic device 901, 902, or 904 or a server 906 may be connected with each other over a network 962 or a short-range communication 964. The electronic device 901 may include a bus 910, a processor 920, a memory 930, an input/output interface 950, a display 960, and a communication interface 970. According to an embodiment of the present disclosure, the electronic device 901 may not include at least one of the above-described elements or may further include another element(s).

For example, the bus 910 may interconnect the above-described elements 910 to 970 and may be a circuit for conveying communications (e.g., a control message and/or data) among the above-described elements.

The processor 920 may include one or more of a CPU, an AP, or a communication processor (CP). For example, the processor 920 may perform an arithmetic operation or data processing associated with control and/or communication of at least other elements of the electronic device 901.

The memory 930 may include a volatile and/or nonvolatile memory. For example, the memory 930 may store instructions or data associated with at least one other element(s) of the electronic device 901. According to an embodiment of the present disclosure, the memory 930 may store software and/or a program 940. The program 940 may include, for example, a kernel 941, a middleware 943, an application programming interface (API) 945, and/or an application program (or "an application") 947. At least a part of the kernel 941, the middleware 943, or the API 945 may be called an "operating system (OS)".

For example, the kernel 941 may control or manage system resources (e.g., the bus 910, the processor 920, the memory 930, and the like) that are used to execute operations or functions of other programs (e.g., the middleware 943, the API 945, and the application program 947). Furthermore, the kernel 941 may provide an interface that allows the middleware 943, the API 945, or the application program 947 to access discrete elements of the electronic device 901 so as to control or manage system resources.

The middleware 943 may perform a mediation role such that the API 945 or the application program 947 communicates with the kernel 941 to exchange data.

Furthermore, the middleware 943 may process task requests received from the application program 947 according to a priority. For example, the middleware 943 may assign the priority, which makes it possible to use a system resource (e.g., the bus 910, the processor 920, the memory 930, or the like) of the electronic device 901, to at least one of the application program 947. For example, the middleware 943 may process the one or more task requests according to the priority assigned to the at least one, which makes it possible to perform scheduling or load balancing on the one or more task requests.

The API 945 may be, for example, an interface through which the application program 947 controls a function provided by the kernel 941 or the middleware 943, and may include, for example, at least one interface or function (e.g., an instruction) for a file control, a window control, image processing, a character control, or the like.

The input/output interface 950 may play a role, for example, an interface which transmits an instruction or data input from a user or another external device, to another element(s) of the electronic device 901. Furthermore, the input/output interface 950 may output an instruction or data, received from another element(s) of the electronic device 901, to a user or another external device.

The display 960 may include, for example, a liquid crystal display (LCD), a light-emitting diode (LED) display, an organic LED (OLED) display, a microelectromechanical systems (MEMS) display, or an electronic paper display. The display 960 may display, for example, various contents (e.g., a text, an image, a video, an icon, a symbol, and the like) to a user. The display 960 may include a touch screen and may receive, for example, a touch, gesture, proximity, or hovering input using an electronic pen or a part of a user's body.

For example, the communication interface 970 may establish communication between the electronic device 901 and an external device (e.g., the first external electronic device 902, the second external electronic device 904, or the server 906). For example, the communication interface 970 may be connected to the network 962 over wireless communication or wired communication to communicate with the external device (e.g., the second external electronic device 904 or the server 906).

The wireless communication may include at least one of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, the short-range communication 964. The short-range communication 964 may include at least one of a Wi-Fi, a Bluetooth (BT), a near field communication (NFC), a magnetic stripe transmission (MST), a global navigation satellite system (GNSS), or the like.

The MST may generate a pulse in response to transmission data using an electromagnetic signal, and the pulse may generate a magnetic field signal. The electronic device 901 may transfer the magnetic field signal to POS, and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or a European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 962 may include at least one of telecommunications networks, for example, a computer network (e.g., local area network (LAN) or wide area network (WAN)), an Internet, or a telephone network.

Each of the first and second external electronic devices 902 and 904 may be a device of which the type is different from or the same as that of the electronic device 901. According to an embodiment of the present disclosure, the server 906 may include a group of one or more servers. According to various embodiments of the present disclosure, all or a part of operations that the electronic device 901 will perform may be executed by another or plural electronic devices (e.g., the electronic devices 902 and 904 or the server 906). According to an embodiment of the present disclosure, in the case where the electronic device 901 executes any function or service automatically or in response to a request, the electronic device 901 may not perform the function or the service internally, but, alternatively additionally, it may request at least a part of a function associated with the electronic device 901 at another device (e.g., the electronic device 902 or 904 or the server 906). The other electronic device (e.g., the electronic device 902 or 904 or the server 906) may execute the requested function or additional function and may transmit the execution result to the electronic device 901. The electronic device 901 may provide the requested function or service using the received result or may additionally process the received result to provide the requested function or service. To this end, for example, cloud computing, distributed computing, or client-server computing may be used.

Figure 10:
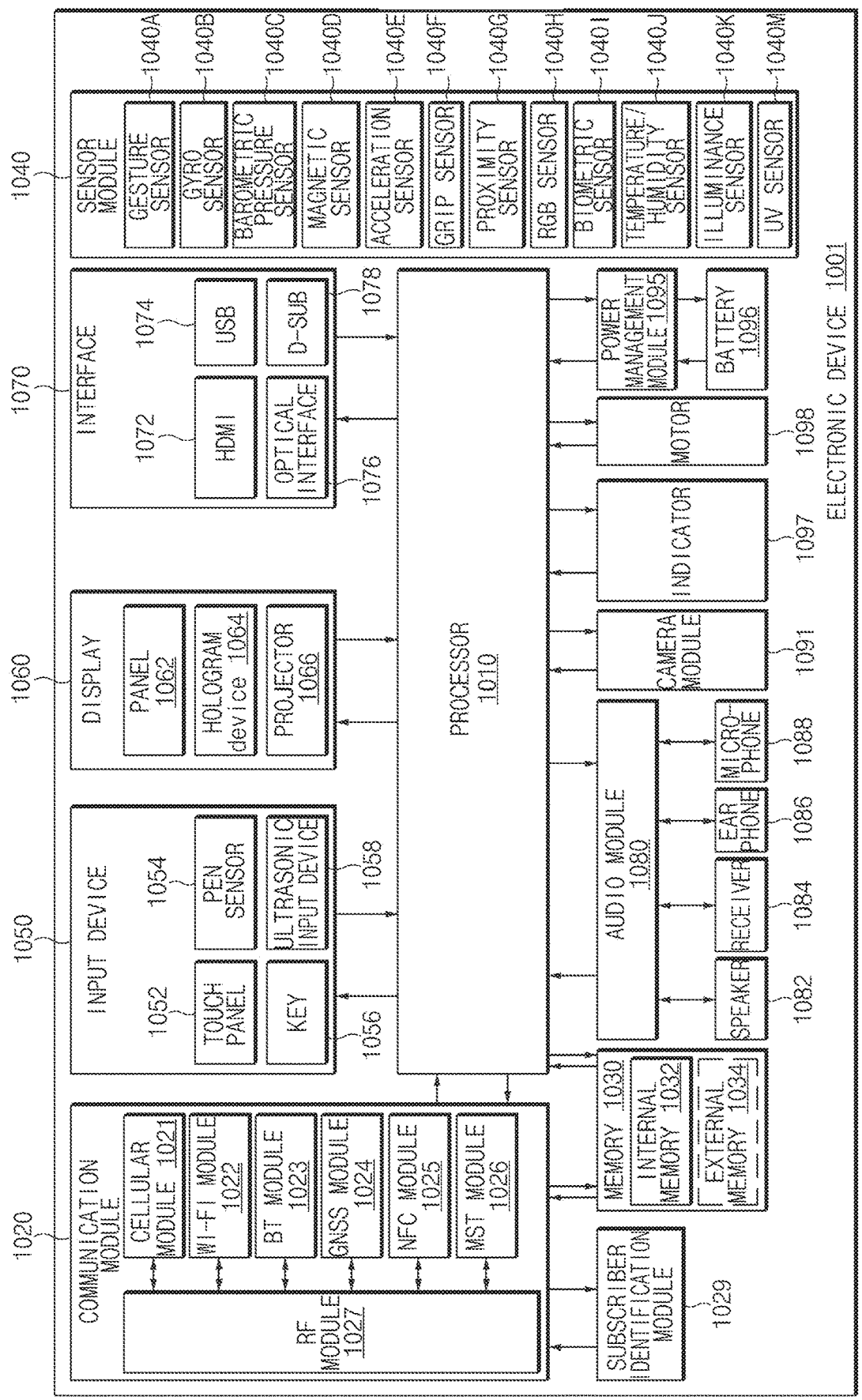
FIG. 10 is a block diagram of an electronic device according to various embodiments of the present disclosure.

FIG. 10 illustrates a block diagram of an electronic device according to various embodiments of the present disclosure.

Referring to FIG. 10, an electronic device 1001 may include, for example, all or a part of the electronic device 901 illustrated in FIG. 9. The electronic device 1001 may include one or more processors (e.g., an AP) 1010, a communication module 1020, a subscriber identification module 1029, a memory 1030, a sensor module 1040, an input/output device 1050, a display 1060, an interface 1070, an audio module 1080, a camera module 1091, a power management module 1095, a battery 1096, an indicator 1097, and a motor 1098.

The processor 1010 may drive, for example, an OS or an application to control a plurality of hardware or software elements connected to the processor 1010 and may process and compute a variety of data. For example, the processor 1010 may be implemented with a system on chip (SoC). According to an embodiment of the present disclosure, the processor 1010 may further include a GPU and/or an image signal processor (ISP). The processor 1010 may include at least a part (e.g., a cellular module 1021) of elements illustrated in FIG. 10. The processor 1010 may load and process an instruction or data, which is received from at least one of other elements (e.g., a nonvolatile memory) and may store a variety of data in a nonvolatile memory.

The communication module 1020 may be configured the same as or similar to the communication interface 970 of FIG. 9. The communication module 1020 may include the cellular module 1021, a Wi-Fi module 1022, a BT module 1023, a GNSS module 1024 (e.g., a GPS module, a Glonass module, a Beidou module, or a Galileo module), a NFC module 1025, a MST module 1026, and a radio frequency (RF) module 1027.

The cellular module 1021 may provide, for example, voice communication, video communication, a character service, an Internet service, or the like over a communication network. According to an embodiment of the present disclosure, the cellular module 1021 may perform discrimination and authentication of the electronic device 1001 within a communication network by using the subscriber identification module (e.g., a SIM card) 1029. According to an embodiment of the present disclosure, the cellular module 1021 may perform at least a portion of functions that the processor 1010 provides. According to an embodiment of the present disclosure, the cellular module 1021 may include a CP.

Each of the Wi-Fi module 1022, the BT module 1023, the GNSS module 1024, the NFC module 1025, or the MST module 1026 may include a processor for processing data exchanged through a corresponding module, for example. According to an embodiment of the present disclosure, at least a part (e.g., two or more) of the cellular module 1021, the Wi-Fi module 1022, the BT module 1023, the GNSS module 1024, the NFC module 1025, or the MST module 1026 may be included within one IC or an IC package.

For example, the RF module 1027 may transmit and receive a communication signal (e.g., an RF signal). For example, the RF module 1027 may include a transceiver, a power amplifier module (PAM), a frequency filter, a low noise amplifier (LNA), an antenna, or the like. According to another embodiment of the present disclosure, at least one of the cellular module 1021, the Wi-Fi module 1022, the BT module 1023, the GNSS module 1024, the NFC module 1025, or the MST module 1026 may transmit and receive an RF signal through a separate RF module.

The subscriber identification module 1029 may include, for example, a card and/or embedded SIM that includes a subscriber identification module and may include unique identify information (e.g., IC card identifier (ICCID)) or subscriber information (e.g., integrated mobile subscriber identity (IMSI)).

The memory 1030 (e.g., the memory 930) may include an internal memory 1032 or an external memory 1034. For example, the internal memory 1032 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard drive, or a solid state drive (SSD).

The external memory 1034 may further include a flash drive, such as compact flash (CF), secure digital (SD), micro SD (Micro-SD), mini SD (Mini-SD), extreme digital (xD), a multimedia card (MMC), a memory stick, or the like. The external memory 1034 may be operatively and/or physically connected to the electronic device 1001 through various interfaces.

A security module may be a module that includes a storage space of which a security level is higher than that of the memory 1030 and may be a circuit that guarantees safe data storage and a protected execution environment. The security module may be implemented with a separate circuit and may include a separate processor. For example, the security module may be in a smart chip or a SD card, which is removable, or may include an embedded secure element (eSE) embedded in a fixed chip of the electronic device 1001. Furthermore, the security module may operate based on an OS that is different from the OS of the electronic device 1001. For example, the security module may operate based on java card open platform (JCOP) OS.

The sensor module 1040 may measure, for example, a physical quantity or may detect an operation state of the electronic device 1001. The sensor module 1040 may convert the measured or detected information to an electric signal. Generally or additionally, the sensor module 1040 may include at least one of a gesture sensor 1040A, a gyro sensor 1040B, a barometric pressure sensor 1040C, a magnetic sensor 1040D, an acceleration sensor 1040E, a grip sensor 1040F, the proximity sensor 1040G, a color sensor 1040H (e.g., red, green, blue (RGB) sensor), a biometric sensor 1040I, a temperature/humidity sensor 1040J, an illuminance sensor 1040K, or an ultraviolet (UV) sensor 1040M. Although not illustrated, additionally or generally, the sensor module 1040 may further include, for example, an E-nose sensor, an electromyography sensor (EMG) sensor, an electroencephalogram (EEG) sensor, an electrocardiogram (ECG) sensor, an infrared (IR) sensor, an iris sensor, a fingerprint sensor, and the like. The sensor module 1040 may further include a control circuit for controlling at least one or more sensors included therein. According to an embodiment of the present disclosure, the electronic device 1001 may further include a processor that is a part of the processor 1010 or independent of the processor 1010 and is configured to control the sensor module 1040. The processor may control the sensor module 1040 while the processor 1010 remains at a sleep state.

The input device 1050 may include, for example, a touch panel 1052, a (digital) pen sensor 1054, a key 1056, or an ultrasonic input unit 1058. For example, the touch panel 1052 may use at least one of capacitive, resistive, IR and ultrasonic detecting methods. In addition, the touch panel 1052 may further include a control circuit. The touch panel 1052 may further include a tactile layer to provide a tactile reaction to a user.

The (digital) pen sensor 1054 may be, for example, a part of a touch panel or may include an additional sheet for recognition. The key 1056 may include, for example, a physical button, an optical key, a keypad, or the like. The ultrasonic input device 1058 may detect (or sense) an ultrasonic signal, which is generated from an input device, through a microphone (e.g., a microphone 1088) and may determine data corresponding to the detected ultrasonic signal.

The display 1060 (e.g., the display 960) may include a panel 1062, a hologram device 1064, or a projector 1066. The panel 1062 may be configured to be the same as or similar to the display 960 illustrated in FIG. 9. The panel 1062 may be implemented, for example, to be flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be arranged in the inside or the outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-sub-miniature (D-sub) 1078. The interface 1070 may be included, for example, in the communication interface 970 illustrated in FIG. 9. Additionally or generally, the interface 1070 may include, for example, a mobile high definition link (MHL) interface, a SD card/multi-media card (MMC) interface, or an IR data association (IrDA) standard interface.

The audio module 1080 may convert a sound and an electric signal in dual directions. At least a part of the audio module 1080 may be included, for example, in the input/output interface 950 illustrated in FIG. 9. The audio module 1080 may process, for example, sound information that is input or output through a speaker 1082, a receiver 1084, an earphone 1086, or the microphone 1088.

The camera module 1091 for shooting a still image or a video may include, for example, at least one or more image sensors (e.g., a front sensor or a rear sensor), a lens, an ISP, or a flash (e.g., an LED or a xenon lamp).

The power management module 1095 may manage, for example, power of the electronic device 1001. According to an embodiment of the present disclosure, a power management IC (PMIC), a charger IC, or a battery or fuel gauge may be included in the power management module 1095. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, and the like. The motor 1098 may convert an electrical signal into a mechanical vibration and may generate the following effects vibration, haptic, and the like. Although not illustrated, a processing device (e.g., a GPU) for supporting a mobile TV may be included in the electronic device 1001. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments of the present disclosure, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 11:
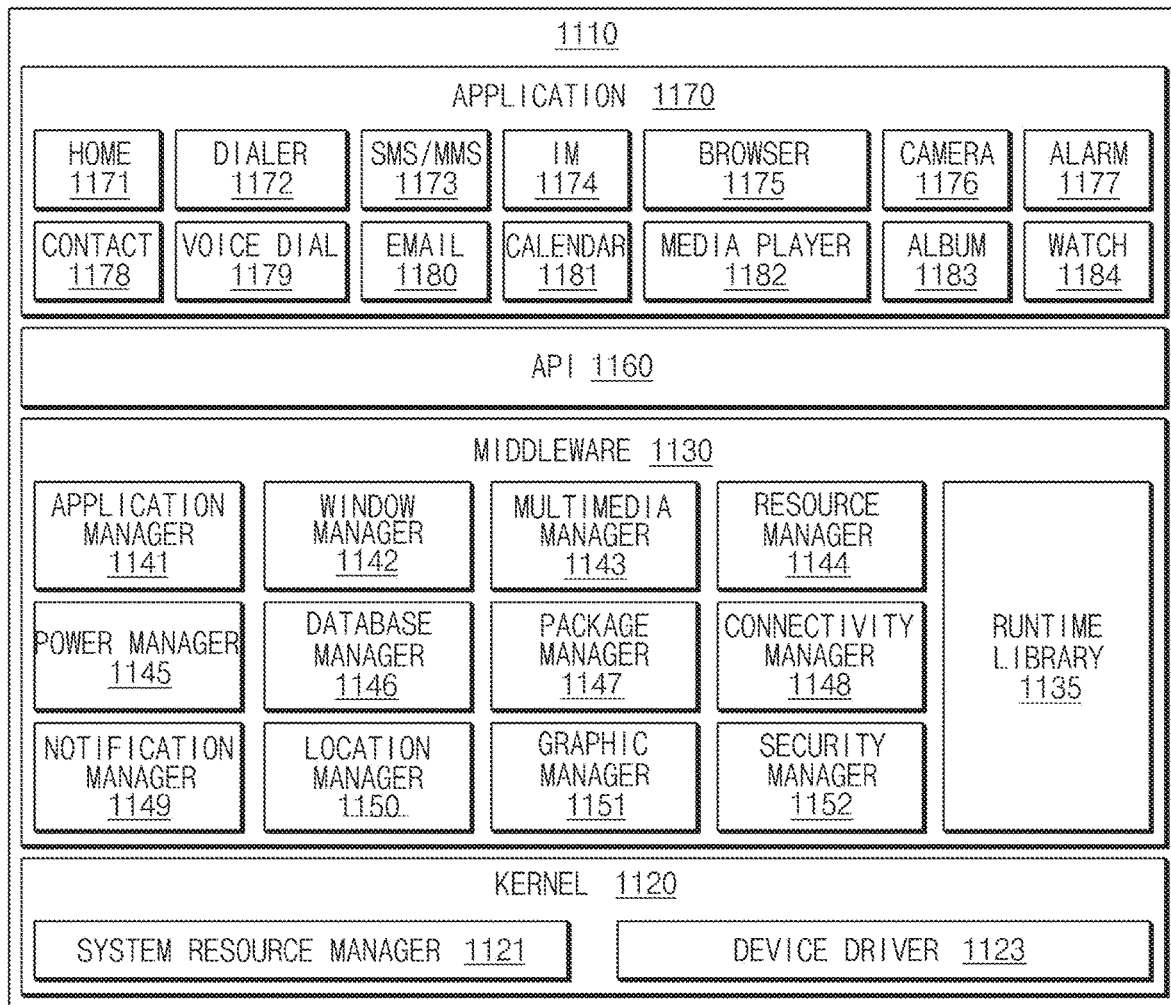
FIG. 11 illustrates a block diagram of a program module according to various embodiments of the present disclosure.

FIG. 11 illustrates a block diagram of a program module according to various embodiments of the present disclosure.

According to an embodiment of the present disclosure, a program module 1110 (e.g., the program 940) may include an OS to control resources associated with an electronic device (e.g., the electronic device 901), and/or diverse applications (e.g., the application program 947) driven on the OS. The OS may be, for example, Android™, iOS™, Windows™, Symbian™, Tizen™, or Samsung bada OS™.

The program module 1110 may include a kernel 1120, a middleware 1130, an API 1160, and/or an application 1170. At least a part of the program module 1110 may be preloaded on an electronic device or may be downloadable from an external electronic device (e.g., the electronic device 902 or 904, the server 906, and the like).

The kernel 1120 (e.g., the kernel 941) may include, for example, a system resource manager 1121 or a device driver 1123. The system resource manager 1121 may perform control, allocation, or retrieval of system resources. According to an embodiment of the present disclosure, the system resource manager 1121 may include a process managing unit, a memory managing unit, or a file system managing unit. The device driver 1123 may include, for example, a display driver, a camera driver, a BT driver, a shared memory driver, a USB driver, a keypad driver, a Wi-Fi driver, an audio driver, or an inter-process communication (IPC) driver.

The middleware 1130 may provide, for example, a function that the application 1170 needs in common, or may provide diverse functions to the application 1170 through the API 1160 to allow the application 1170 to efficiently use limited system resources of the electronic device. According to an embodiment of the present disclosure, the middleware 1130 (e.g., the middleware 943) may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphics manager 1151, a security manager 1152, or a payment manager 1154.

The runtime library 1135 may include, for example, a library module that is used by a compiler to add a new function through a programming language while the application 1170 is being executed. The runtime library 1135 may perform input/output management, memory management, or capacities about arithmetic functions.

The application manager 1141 may manage, for example, a life cycle of at least one application of the application 1170. The window manager 1142 may manage a GUI resource that is used in a screen. The multimedia manager 1143 may identify a format necessary for playing diverse media files, and may perform encoding or decoding of media files by using a codec suitable for the format. The resource manager 1144 may manage resources, such as a storage space, memory, or source code of at least one application of the application 1170.

The power manager 1145 may operate, for example, with a basic input/output system (BIOS) to manage a battery or power, and may provide power information for an operation of an electronic device. The database manager 1146 may generate, search for, or modify database that is to be used in at least one application of the application 1170. The package manager 1147 may install or update an application that is distributed in the form of package file.

The connectivity manager 1148 may manage, for example, wireless connection, such as Wi-Fi or BT. The notification manager 1149 may display or notify an event, such as arrival message, appointment, or proximity notification in a mode that does not disturb a user. The location manager 1150 may manage location information about an electronic device. The graphic manager 1151 may manage a graphics effect that is provided to a user, or manage a UI relevant thereto. The security manager 1152 may provide a general security function necessary for system security or user authentication. According to an embodiment of the present disclosure, in the case where an electronic device (e.g., the electronic device 901) includes a telephony function, the middleware 1130 may further includes a telephony manager for managing a voice or video call function of the electronic device.

The middleware 1130 may include a middleware module that combines diverse functions of the above-described elements. The middleware 1130 may provide a module specialized to each OS kind to provide differentiated functions. Additionally, the middleware 1130 may dynamically remove a part of the preexisting elements or may add new elements thereto.

The API 1160 (e.g., the API 945) may be, for example, a set of programming functions and may be provided with a configuration that is variable depending on an OS. For example, in the case where an OS is the android or the iOS™, it may be permissible to provide one API set per platform. In the case where an OS is the tizen, it may be permissible to provide two or more API sets per platform.

The application 1170 (e.g., the application program 947) may include, for example, one or more applications capable of providing functions for a home 1171, a dialer 1172, an short message service (SMS)/multimedia messaging service (MMS) 1173, an instant message (IM) 1174, a browser 1175, a camera 1176, an alarm 1177, a contact 1178, a voice dial 1179, an e-mail 1180, a calendar 1181, a media player 1182, an album 1183, and a timepiece 1184, or for offering health care (e.g., measuring an exercise quantity, blood sugar, or the like) or environment information (e.g., atmospheric pressure, humidity, temperature, or the like).

According to an embodiment of the present disclosure, the application 1170 may include an application (hereinafter referred to as "information exchanging application" for descriptive convenience) to support information exchange between an electronic device (e.g., the electronic device 901) and an external electronic device (e.g., the electronic device 902 or 904). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 902 or 904). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 902 or 904) which communicates with the electronic device, an application running in the external electronic device, or a service (e.g., a call service, a message service, or the like) provided from the external electronic device.

According to an embodiment of the present disclosure, the application 1170 may include an application (e.g., a health care application of a mobile medical device) that is assigned in accordance with an attribute of an external electronic device (e.g., the electronic device 902 or 904). According to an embodiment of the present disclosure, the application 1170 may include an application that is received from an external electronic device (e.g., the server 906 or the electronic device 902 or 904). According to an embodiment of the present disclosure, the application 1170 may include a preloaded application or a third-party application that is downloadable from a server. The element titles of the program module 1110 according to the embodiment may be modifiable depending on kinds of OSs.

According to various embodiments of the present disclosure, at least a part of the program module 1110 may be implemented by software, firmware, hardware, or a combination of two or more thereof. At least a portion of the program module 1110 may be implemented (e.g., executed), for example, by the processor (e.g., the processor 1010). At least a portion of the program module 1110 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 920), may cause the one or more processors to perform a function corresponding to the instruction. The computer-readable storage media, for example, may be the memory 930.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of this disclosure, power needed to drive a display may decrease by using a different parameter based on a screen to be displayed in a display.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
    a housing;
    a plurality of displays comprising a first display and a second display which output display in one display and are located inside the housing;
    a first display driver circuit connected with the first display;
    a second display driver circuit connected with the second display;
    a memory configured to store a first application, a first parameter, a second application different from the first application, and a second parameter, wherein the second application is an application that simultaneously requires a high-quality execution screen to display video contents and a relatively low quality execution screen to display contents without a video content, and the first application is an application that requires a relatively low quality execution screen to display contents without a video content, wherein the first parameter includes a first display driver circuit setting value and a first processor setting value associated with the first application, wherein the second parameter includes a second display driver circuit setting value and a second processor setting value associated with the second application, and wherein the second display driver circuit setting value is different from the first display driver circuit setting value, and the second processor setting value is different from the first processor setting value; and
    a processor electrically connected with the plurality of displays, the first display driver circuit, the second display driver circuit and the memory,
    wherein the processor is configured to:
        when the first application is executed, obtain the first parameter from the memory, apply the first display driver circuit setting value to the first display driver circuit, apply the first processor setting value to the processor, and output a first execution screen of the first application in the first display, and
        when the second application is executed while the first execution screen of the first application is being outputted in the first display, obtain the second parameter from the memory, apply the second display driver circuit setting value which is different from the first display driver circuit setting value to the second display driver circuit, change the first processor setting value of the processor to the second processor setting value which requires higher performance of the processor among the first processor setting value and the second processor setting value, and output a second execution screen of the second application in the second display,
        when the second application is executed in background while the first execution screen of the first application is being executed in foreground in the first display, obtain the second parameter from the memory, apply the second display driver circuit setting value which requires higher specifications than the first display driver circuit setting value to the first display driver circuit, change the first processor setting value of the processor to the second processor setting value which requires higher performance of the processor among the first processor setting value and the second processor setting value, and maintain outputting the first execution screen of the first application in the first display.

2. The electronic device of claim 1, wherein the processor is further configured to:
    display the first execution screen and the second execution screen based on the first parameter and the second parameter associated with at least one of a frame per second (FPS), a resolution, brightness, a color space, a central processing unit (CPU) clock, a graphics processing unit (GPU) clock, or boosting.

3. The electronic device of claim 1, wherein the processor is further configured to apply different parameters to each of the plurality of displays.

4. The electronic device of claim 1,
wherein the memory is further configured to store a database including the parameters mapped onto the first and second applications, and
wherein the processor is further configured to obtain the first parameter and the second parameter from the database.

5. The electronic device of claim 1, wherein the processor is further configured to:
measure a system load while the first execution screen or the second execution screen is displayed, and
change the first parameter or the second parameter based on the system load.

6. The electronic device of claim 5, wherein the processor is further configured to:
when the first parameter or the second parameter is changed, store the changed first parameter or the changed second parameter in the memory, and
when at least one application is again executed, display each of the first execution screen and the second execution screen based on the changed first parameter or the changed second parameter obtained from the memory.

7. The electronic device of claim 5, further comprising:
a communication circuit configured to communicate with a server in which a database including the parameters is stored,
wherein the processor is further configured to:
when the first parameter or the second parameter is changed, transmit the changed first parameter or the changed second parameter to the server using the communication circuit, and
when at least one application is again executed, obtain the changed first parameter and the changed second parameter included in the database from the server.

8. A display control method of an electronic device including a housing, a memory storing a first application and a second application, a plurality of displays including a first display and a second display which output display in one display and are located inside the housing, a first display driver circuit connected with the first display, a second display driver circuit connected with the second display, and a processor electrically connected with the plurality of displays, the memory, the first display driver circuit and the second display driver circuit, the method comprising:
when the first application is executed, obtaining, from the memory, a first parameter which includes a first display driver circuit setting value and a first processor setting value and is associated with the first application stored in the memory, applying the first display driver circuit setting value to the first display driver circuit, applying the first processor setting value to the processor, and outputting a first execution screen of the first application in the first display, wherein the second application is an application that simultaneously requires a high-quality execution screen to display video contents and a relatively low quality execution screen to display contents without a video content, and the first application is an application that requires a relatively low quality execution screen to display contents without a video content, and
when the second application, which is different from the first application, is executed while the first execution screen of the first application is being outputted in the first display, obtaining, from the memory, a second parameter which includes a second display driver circuit setting value and a second processor setting value and is associated with the second application stored in the memory, applying the second display driver circuit setting value which is different from the first display driver circuit setting value to the second display driver circuit, changing the first processor setting value of the processor to the second processor setting value which requires higher performance of the processor among the first processor setting value and the second processor setting value, and outputting a second execution screen of the second application in the second display,
when the second application is executed in background while the first execution screen of the first application is being executed in foreground in the first display, obtaining the second parameter from the memory, applying the second display driver circuit setting value which requires higher specifications than the first display driver circuit setting value to the first display driver circuit, changing the first processor setting value of the processor to the second processor setting value which requires higher performance of the processor among the first processor setting value and the second processor setting value, and maintaining outputting the first execution screen of the first application in the first display.

9. An electronic device comprising:
a housing;
at least one display comprising a first display including a first area and a second display including a second area for displaying at least one content, wherein the first display and the second display output display in one display and are located inside the housing;
a first display driver circuit connected with the first display;
a second display driver circuit connected with the second display;
a memory configured to store a first content, a first parameter, a second content different from the first content, and a second parameter, wherein the second content simultaneously includes a video content that requires a high-quality execution screen and a content without a video content that requires a relatively low quality execution screen, and the first content includes a content without a video content that requires a relatively low quality execution screen, wherein the first parameter includes a first display driver circuit setting value and a first processor setting value associated with the first content, wherein the second parameter includes a second display driver circuit setting value and a second processor setting value associated with the second content, and wherein the second display driver circuit setting value is different from the first display driver circuit setting value, and the second processor setting value is different from the first processor setting value; and
a processor electrically connected with the at least one display, the first display driver circuit, the second display driver circuit, and the memory;
wherein the processor is configured to:
when the first content is selected, obtain the first parameter from the memory, apply the first display driver circuit setting value to the first display driver circuit, apply the first processor setting value to the processor, and output the first content in the first display, and when the second content is executed while the first content is being outputted in the first display, obtain the second parameter from the memory, apply the second display driver circuit setting value which is different from the first display driver circuit setting value to the second display driver circuit, change the first processor setting value of the processor to the second processor setting value which requires higher performance of the processor among the first process setting value and the second process setting value, and output the second content in the second display, when the second content is executed in background while the first content is being executed in foreground in the first display, obtaining the second parameter from the memory, applying the second display driver circuit setting value which requires higher specification than the first display driver circuit setting value to the first display driver circuit, changing the first processor setting value of the processor to the second processor setting value which requires higher performance of the processor among the first processor setting value and the second processor setting value, and maintaining outputting the first content in the first display.

10. The electronic device of claim 9, wherein the processor is further configured to:
measure a load associated with the processor while the first content or the second content is displayed, and
adjust the first parameter or the second parameter based on the load.

11. The electronic device of claim 9, wherein the first parameter or the second parameter comprises a frame per second (FPS), a resolution, brightness, a color space, a central processing unit (CPU) clock, a graphics processing unit (GPU) clock, boosting, or a combination thereof.

12. The electronic device of claim 9, wherein attribute information comprises information for identifying the first content and the second content.

13. The electronic device of claim 12, wherein the processor is further configured to store a parameter corresponding to the attribute information in a database.

14. The electronic device of claim 13, wherein the processor is further configured to determine the first parameter and the second parameter based on the database.

15. The electronic device of claim 13, wherein the processor is further configured to:
change the first parameter or the second parameter based on a load when the first content and the second content are displayed, and
store the changed first parameter or the changed second parameter in the database.

* * * * *